(12) United States Patent
Albert et al.

(10) Patent No.: US 9,989,380 B2
(45) Date of Patent: Jun. 5, 2018

(54) METHOD, LINEAR DRIVE AND INSTALLATION

(71) Applicants: Siemens Aktiengesellschaft, Munich (DE); Festo AG & Co. KG, Esslingen (DE)

(72) Inventors: Fabian Albert, Kernen im Remstal (DE); Ralf Hartramph, Albershausen (DE); Chris Hofmann, Stuttgart (DE); Michael Jaentsch, Erlangen (DE); Sven Rothe, Tabarz (DE); Carsten Spindler, Remptendorf (DE); Andreas Veit, Filderstadt (DE)

(73) Assignees: Siemens Aktiengesellschaft, Munich (DE); Festo AG & Co. KG, Esslingen (DE)

( * ) Notice: Subject to any disclaimer, the term of this patent is extended or adjusted under 35 U.S.C. 154(b) by 0 days. days.

(21) Appl. No.: 15/480,568

(22) Filed: Apr. 6, 2017

(65) Prior Publication Data
US 2017/0305671 A1  Oct. 26, 2017

(30) Foreign Application Priority Data

Apr. 22, 2016  (EP) ................................. 16166630

(51) Int. Cl.
| | |
|---|---|
| *G01D 5/14* | (2006.01) |
| *B65G 15/22* | (2006.01) |
| *B65G 43/00* | (2006.01) |
| *G01D 18/00* | (2006.01) |

(52) U.S. Cl.
CPC .............. *G01D 5/145* (2013.01); *B65G 15/22* (2013.01); *B65G 43/00* (2013.01); *G01D 18/00* (2013.01)

(58) Field of Classification Search
CPC ............................ B65G 15/22; G01D 5/24471
See application file for complete search history.

(56) References Cited

U.S. PATENT DOCUMENTS

| | | | | |
|---|---|---|---|---|
| 6,176,365 B1 * | 1/2001 | Klemm | ................ | B21D 43/055 |
| | | | | 198/464.4 |
| 6,218,829 B1 * | 4/2001 | Wittenstein | ............ | G01B 7/003 |
| | | | | 324/207.21 |
| RE39,747 E * | 7/2007 | Peltier | ........................ | 310/12.11 |

(Continued)

FOREIGN PATENT DOCUMENTS

| | | |
|---|---|---|
| DE | 208855 A1 | 4/1984 |
| DE | 102012205902 A1 | 10/2013 |

(Continued)

*Primary Examiner* — Thomas Randazzo
(74) *Attorney, Agent, or Firm* — Cozen O'Connor (57) ABSTRACT

A method for ascertaining a position error in a linear drive, a linear drive, a method for operating the linear drive and an installation, wherein the deviation of a respective further runner in relation to a first runner (reference runner) is ascertained to determine the position error, where the discrepancy of the respective sensor is ascertained based on the deviation of the runner, the discrepancy may be ascertained using a reference system, the position error may be established based on the discrepancy of the respective sensor PS and the deviation of the respective runner, and where the position error may serve for the improved positioning, i.e., more precise positioning, of the respective runner on the linear drive or of the segments.

19 Claims, 7 Drawing Sheets

(56) References Cited

U.S. PATENT DOCUMENTS

| | | | | |
|---|---|---|---|---|
| 7,423,421 B2 * | 9/2008 | Reichert et al. | ........ | F15B 15/10 |
| | | | | 324/207.2 |
| 7,528,561 B2 * | 5/2009 | Kawai | .................... | F16C 29/00 |
| | | | | 310/13 |
| 9,188,421 B2 * | 11/2015 | Prussmeier | .......... | G01D 5/2046 |
| 2007/0046287 A1 | 3/2007 | Vervaeke et al. | | |
| 2015/0084619 A1 * | 3/2015 | Stark | ...................... | G01D 5/145 |
| | | | | 324/207.2 |
| 2017/0130809 A1 * | 5/2017 | Rath | ........................ | B23Q 5/38 |

FOREIGN PATENT DOCUMENTS

| | | | |
|---|---|---|---|
| DE | 102012104840 A1 | 12/2013 | |
| EP | 1586868 A1 * | 10/2005 | ............. G01D 5/145 |
| EP | 2466269 A2 * | 6/2012 | ............. G01D 5/145 |
| EP | 1720026 B1 | 4/2013 | |
| FR | 2897682 A1 | 8/2007 | |
| JP | 2009276262 A | 11/2009 | |

* cited by examiner

METHOD, LINEAR DRIVE AND INSTALLATION

BACKGROUND OF THE INVENTION

1. Field of the Invention

The invention relates to a method for ascertaining and a method for correcting a position error, a method for operating a linear drive, a linear drive and an installation with such a linear drive.

2. Description of the Related Art

Currently, linear drives are widespread in industrial installations, machine tools and production and processing sites.

Linear drives usually have segments and runners movable thereon, with the runners being provided for positioning and/or transporting workpieces and/or goods on the segments. Linear drives may be formed as conveyor belts or as linear drives which, at least in regions, are complemented by linear motors. Here, the segments are formed as conveyor belts or as linear motor stators.

Positioning of the workpieces and goods as accurately as possible via the linear drive is becoming increasingly decisive.

A high level of accuracy of the positioning of the runners is required for some applications.

Sensors, such as Hall sensors, usually serve to determine the position of the runners.

EP 1 720 026 B1 and DE 10 2012 205 902 A1 show such sensors which are suitable for determining a position of a magnetic element.

SUMMARY OF THE INVENTION

It is an object of the present invention to provide a method for ascertaining and correcting position errors, in particular for linear drives.

This and other objects and advantages are achieved in accordance with the invention by a method for ascertaining a position error, a method for correcting a position error, a method for operating a linear drive, a linear drive and by an installation with such a linear drive, wherein in accordance with the method for ascertaining the position error for the linear drive, the linear drive comprises runners, at least one segment, and a control device, where a respective runner comprises a detection element, and where a respective position of the respective runner is ascertained based on the detection element via at least one sensor.

The method in accordance with the invention comprises at least the following steps:
determining the respective position and/or alignment of the detection element of a first runner and further runners,
comparing the respective position and/or the alignment of the detection element of the respective further runners with the position and/or alignment of the respective detection element of the first runner to determine deviations between the position and/or the alignment of the detection element of the respective further runner and the respective position and/or alignment of the detection element of the first runner,
assigning the respective deviation to the respective further runner,
determining a discrepancy of the sensor with the aid of the first runner,
assigning the respective discrepancy to the corresponding sensor, and
determining the position error of the respective runner by linking the deviation of the respective further runner and the discrepancy of the sensor.

A linear drive is understood to be a linear transport system, where runners are provided for transporting and/or positioning goods and workpieces.

The segment serves to move the respective runner. The segment serves to transport and/or position the runner in the region of the respective segment. A segment may be formed as a stator of a linear motor. The respective segment or a further segment may be embodied as a conveyor belt. A segment may further be configured as a spindle drive.

The respective runner serves to receive the goods or the workpiece. The runner is configured such that the runner may be moved on the segment. If one of the segments is a stator of a linear motor, the runner, e.g., has permanent magnets on the lower side thereof such that the magnetic field emanating from the segment may induce a movement of the runner. Such a runner may also be moved by a conveyor belt. Where necessary, the runner may also comprise rollers for straight-line movement.

The runner comprises the detection element. By way of example, a magnetic element, i.e., a permanent magnet, serves as a detection element. The detection element may also comprise a lighting device, in particular an LED, a laser diode, or an indicator. The embodiment of the sensor is based on the type of detection element. The sensor serves to determine the position of the detection element and hence to determine the position of the runner.

A deviation is understood to mean how far the detection element deviates from the position or the place at which the detection element is provided. Further, the deviation is understood to mean how far the detection element deviates from the envisaged alignment.

Depending on the type of detection element, the sensor is by way of example in accordance with an operating principle: magnetostrictive, capacitive, magnetic, optical, inductive, and/or differential-transformer-like.

In a preferred embodiment, the sensor comprises a plurality of Hall sensors that are arranged next to one another, in particular along a line.

In a further preferred embodiment, the sensor is configured as a magnetostriction sensor. In the preferred embodiments, a magnetic element, i.e., a permanent magnet, serves as a detection element.

The discrepancy is understood to mean how far from its actual position or alignment the detection element is detected by the sensor. In particular, the discrepancy is composed of two components: the nonlinearity and the installation error.

A first component of the discrepancy of the sensor is the nonlinearity of the sensor. A nonlinearity is understood to mean that the accuracy of ascertaining the position of a detection element depends on the ascertained position itself. Hence, the sensor has a different discrepancy at two respective positions.

The installation error is a second component of a discrepancy of the sensor. An installation error of the sensor is understood to mean an inaccurate placement of the sensor. The discrepancy at different positions remains the same in the case of the installation error.

With respect to determining the position of a runner in the case of a linear drive described here, the installation error should be understood to mean an inaccurate position of the sensor in relation to the segment.

In addition, the nonlinearity of the sensor should be understood to mean, e.g., differences in the position of the sensor elements in relation to one another.

Causes of such a discrepancy are inaccuracies in the position of the sensor or individual sensor elements, if the sensor comprises a multiplicity of individual sensor elements.

In particular, the first runner is understood to be a reference runner. The reference runner serves as a reference and defines the deviation of zero. The position and alignment of the detection element of the first runner in each case serves to define the deviation of the further runners. Thus, the place/alignment at which the detection element of the respective further runner is determined in relation to the place/alignment of the detection element. The deviation of the place/alignment of the detection element of the respective further runner in comparison with the first runner is assigned to the respective runner as a deviation. Hence, the first runner has a deviation of zero and the further runners have a deviation in relation to the first runner.

For the purposes of determining the discrepancy, the first runner is positioned on the respective segment and the respective sensor, which is assigned to the respective segment, determines the position of the runner at the respective position. The position is advantageously ascertained at a plurality of different places or positions.

The discrepancy of the respective sensor is the difference between the ascertained position of the first runner and the actual position of the first runner on the respective segment. The discrepancy is assigned to the sensor. In other words, the discrepancy specifies the measurement error of the sensor.

The position error of the respective runner on the respective segment may be calculated from the discrepancy of the respective sensor and the deviation of the respective runner via simple addition of the deviation and the discrepancy.

The position error ascertained may thus be taken into account when positioning and/or transporting the runner of the linear drive.

The precision and the accuracy of the positioning of the respective runner may be increased by ascertaining the position error if the position error is taken into account.

Advantageously, the first runner (reference runner) may also be formed as a virtual axis in the control device.

The first runner then corresponds to a virtual axis, where the detection element is positioned at the provided place and aligned in the provided alignment. In the control device, the deviation is advantageously taken into account at the virtual axis.

In the case of a runner that is imaged as a virtual axis in the control device, the respective deviation is advantageously provided in the form of a table or a correction function. Advantageously, the respective deviation of a runner along the corresponding virtual axis is taken into account in the actuation by the respective control unit.

The discrepancy of the sensor is advantageously determined with the aid of a further runner, the deviation of which is taken into account when determining the discrepancy.

Using an optional method step, i.e., correcting the ascertained position error, particularly with the aid of the control device, the method for determining the position error becomes a method for correcting the position error.

In accordance with the further method step, the ascertained discrepancy is corrected in a computing unit of the sensor. To this end, a computing unit, in particular a microcontroller, is assigned to the sensor. The computing unit corrects the discrepancy of the sensor and provides the discrepancy-corrected signal to the control unit and/or the control device.

The method for operating a linear drive may also be improved with the aid of the further method step.

With a preferred method for correcting the position error of at least one runner of a linear drive, the linear drive comprises a segment or a plurality of segments, where at least one sensor is respectively assigned to some of the segments, where the sensor has a discrepancy, where each respective runner has a detection element, where the detection element is fastened to the runner with a deviation, and where the method comprises at least the following steps:

ascertaining the deviation of the respective runner and assigning the respective deviation to the corresponding runner, optionally assigning the deviation to an identification of the respective runner, where the identification is particularly assigned to the runner, optionally assigning the respective deviation to the corresponding runner by storing the respective deviation in the control unit or in the control device of the linear drive, ascertaining the respective discrepancy of the respective sensor and storing the respective discrepancy in a computing unit assigned to the sensor, transferring the identification of the respective runner into the control unit and/or the control device, providing the position of the respective runner for the control device or the respective control unit, where the position has been corrected with respect to the discrepancy of the sensor, correcting the deviation of the respective runner, wherein the deviation of the respective runner is corrected, in particular, in the control device, providing the position-error-corrected position of the respective runner to the control device and/or the respective control unit.

Particularly accurate positioning of the respective runner via the linear drive is possible by way of the above-explained method.

The linear drive comprises a control device, at least one segment, one or more runners and at least one sensor, where the control device is configured to perform one of the above-described methods.

The control device is advantageously formed as a movement controller, i.e., a programmable logic controller (PLC). The control device may also be assisted by further control units, where the control units serve to supply current or voltage to the segments. Here, the control units may be formed as power converters or as frequency converters. The control device advantageously predetermines the movement sequence, whereby the movement provides an indication of how the runners are moved by (or though) the segments.

The movement sequence may be ascertained based on virtual axes. The respective virtual axis describes the movement of the respective runner at a software level. The principle of the virtual axis in relation to a linear drive is described in an exemplary manner in EP application number 16161433.4. The virtual axis may be corrected by the deviation of the corresponding further runner.

In an advantageous embodiment of the method for ascertaining the position error, a position, corrected by the discrepancy, of the respective runner is provided based on the discrepancy of the respective sensor.

The discrepancy of the respective sensor may be stored in a storage assigned to the sensor. The discrepancy may be corrected in a computing unit, i.e., a microcontroller respectively assigned to the sensor, from the ascertained position. As a result of this configuration, the respective discrepancy of the sensors is corrected and the discrepancy-corrected position of the runner is provided by the sensor or by the respectively assigned computing unit.

By correcting the provided position, it is possible to dispense with a correction of the discrepancy in the control device of the linear drive. As a result of this configuration, use may also be made of a control device without a discrepancy correction.

In a further advantageous embodiment of the method for ascertaining the position error, a position, corrected by the deviation, of the respective runner is provided based on the respective deviation of the respective further runner.

Providing the position of the respective (further) runner, the position is advantageously corrected by the deviation. The deviation is preferably corrected in the control unit. Hence, taking account of the respective deviation of the respective runner is dispensed with when creating the movement sequence, in particular with the aid of the control device.

The deviation of the respective further runner may also form the basis for closed-loop control of the position of the runner.

In a further advantageous embodiment of the method for ascertaining the position error, the respective discrepancy is determined after arranging the segments in accordance with a first discrepancy measurement method, where the first discrepancy measurement method comprises at least the following steps:

positioning the first runner on the respective segment in accordance with a predetermined movement sequence, particularly at set places or positions on the segment, ascertaining the respective position of the respective runner with the aid of the at least one sensor, comparing the ascertained position with a position of the first runner predetermined by movement predetermined by the movement sequence, and determining the discrepancy of the at least one sensor from the comparison.

The (first) discrepancy measurement method is advantageously performed after an assembly of the linear drive, i.e., if the linear drive comprises a plurality of sensors.

The control device advantageously predetermines the movement sequence. The respective position of the runner is predetermined based on the movement sequence. The position of the runner, i.e., of the first runner, is determined with the aid of the respective sensor. The position is advantageously determined at a multiplicity of places or positions on the respective segment. The ascertained position of the respective runner is corrected by the deviation of the respective runner. The discrepancy of the respectively ascertained position is determined by comparing the predetermined position with the ascertained position.

The above-described method is particularly suitable when starting up a linear drive. The above-described method advantageously serves to ascertain the discrepancies by, e.g., an offset of the sensors in relation to one another. The offset of the sensors in relation to one another is taken into account and/or corrected by the discrepancy of the respective sensor.

In a further advantageous embodiment of the method for ascertaining the position error, the method for determining the discrepancy of the at least one sensor is performed based on a second discrepancy measurement method, where the second discrepancy measurement method comprises the following steps:

moving the first runner with the aid of a reference system, where the reference system positions the first runner in accordance with a predetermined movement sequence at a respectively predetermined position, ascertaining the position of the first runner with the at least one sensor, comparing the ascertained position of the runner and the predetermined position of the runner, and determining the discrepancy of the at least one sensor based on the comparison.

By way of example, an apparatus in which a runner, i.e., the first runner, or a detection element is positioned at predetermined positions or places on the respective segment is suitable as a reference system. A runner that positions a runner, i.e., a first runner, at a multiplicity of predetermined positions independently of the linear drive is also suitable as a reference system.

In contrast to the preceding method, the reference system is independent of the linear drive and the components thereof.

The two configurations of the method explained above advantageously serve to increase the accuracy of the movement or the positioning of the runners of the linear drive. Advantageously, the two configurations of the method explained above may quickly ensure high accuracy in the positioning or movement of the linear drive when setting up a newly constructed linear drive.

In a further advantageous embodiment of the method for ascertaining the position error, an identification is at least assigned in each case to the at least one further runner.

An identification may comprise a number of the runner and hence facilitate addressing of the runner in the linear drive. The identification may also comprise the deviation of the respective runner. The identification is advantageously assigned to the respective runner.

In an advantageous embodiment of such a runner, the runner comprises a storage element or readable code in each case. The storage element may be formed as an RFID chip. The storage element is fastened to the runner. The storage element is advantageously configured such that an identification may be written and/or the identification may be read in a contactless manner. The readout of the identification and/or of the storage element is performed by a detector. The identification or the read content of the respective storage element is provided for the control device and/or the respective control unit.

Advantageously, the respective identification of the runner is read out by a readout element that is assigned to the sensor and/or the segment. The identification may be provided to the control device and/or the computing unit assigned to the respective sensor. The provided identification may simplify ascertaining and correcting the position error.

In a further advantageous embodiment of the method for ascertaining the position error, the movement of the respective runner is in each case performed based on a virtual axis, where the deviation of the respective runner is assigned to the respective virtual axis.

The movement of the respective runner is performed based on a movement sequence. The movement sequence may be predetermined by the control device. For the purposes of describing the movement sequence in this embodiment, the control device uses the principle of virtual axes. A virtual axis describes the movement of the respective runner. When determining the movement sequence, the virtual axis is corrected in accordance with the deviation of the respective runner.

A virtual axis describes the movement of the runner corresponding to the virtual axis. In other words, a virtual axis reproduces the movement of the corresponding runner in the control device.

If there is a change in the movement sequence, the identification, i.e., the deviation, of the respective runner is advantageously ascertained. Here, the deviation of the respective runner is provided to the corresponding virtual axis. The virtual axis is advantageously corrected based on the deviation of the corresponding runner.

In a further advantageous embodiment of the method for ascertaining the position error, one sensor is respectively assigned to a segment in each case.

The sensor is advantageously fastened to the respective segment in this configuration. The respective segment then optionally still comprises the computing unit, with the computing unit being assigned to the sensor. Hence, the segment comprising a sensor and optional computing unit may serve as a unit.

As a result of the presently contemplated embodiment, the segments may easily be combined when setting up the linear drive, without having to take account of the requirements of a sensor.

In a further advantageous configuration of the method for ascertaining the position error, at least one sensor ascertains the respective position of the at least one runner over a plurality of segments.

By ascertaining the position of the respective runner via a sensor that is formed over a plurality of segments, it is possible to reduce discrepancies when the runner transfers from one segment to a further segment. Such a sensor may be based on the principle of magnetostriction. Such a sensor may also be an array of light detectors or Hall sensors.

Advantageously, the sensor only has one discrepancy, with only one discrepancy having to be taken into account when ascertaining the position error.

In a further advantageous embodiment of the method for ascertaining the position error, the position error is provided in a value table or a correction function of the control device. The value table may be available in the computing unit assigned to the sensor, the control unit and/or the control device. Advantageously, the value table and/or the correction function also contains the deviation of the respective runner and, optionally, the discrepancy of the respective sensor.

The position error of the respective runner is corrected with the aid of the value table or the correction function. The correction advantageously occurs in the control device. Advantageously, the control device determines a movement sequence that is corrected to take account of the position error. The runners are moved through the segments or positioned based on the corrected movement sequence, i.e., with the aid of the control units.

There may be particularly accurate positioning of the runner by the linear drive as a result of the configuration described above.

In the method for operating a linear drive suitable for achieving the aforementioned object, a movement sequence, i.e., as a virtual axis in each case, is assigned to the respective runners, wherein the movement sequence of the respective runner about the ascertained position error thereof is corrected in accordance with a method in accordance with disclosed embodiments.

The position error is advantageously determined at the outset during operation of the linear drive. After the position error is determined, the position error is taken into account as a combination of deviation of the respective runner and discrepancy of the respective sensor when determining the movement sequence.

For an unchanging high accuracy of the positioning of the respective runner of the linear drive, the position error is ascertained as described here at regular temporal intervals.

The linear drive suitable for achieving the aforementioned object comprises a control device, at least one segment, one or more runners and at least one sensor, where the control device is embodied to carry out a method in accordance with disclosed embodiments.

In the method for operating a linear drive, the linear drive comprises at least one segment, further runners, at least one control unit, sensors and, optionally, a control device, where the further runners are positioned on the segments, the respective control unit controls and/or regulates the position of the further runners, where the respective sensor ascertains the position and/or the speed of the respective runner on the respective segment, where the position error of the position of the respective runner is corrected by a method in accordance with disclosed embodiments, and where the respectively corrected position of the respective further runner serves, in the control unit and/or in the control device, to control or regulate the positioning of the respective further runner on the respective segment.

A linear motor with a runner or a plurality of runners (in each case formed as a secondary part of the linear motor), a conveyor belt, a combination of at least one linear motor and at least one conveyor belt may serve as linear drive. A linear drive as described here is advantageously part of an installation.

For the purposes of solving the aforementioned object, the installation comprises a linear drive as described above. Advantageously, the installation is formed as a machine tool, a production machine, a packaging machine, a filling installation or a transportation device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Below, the invention is described and explained in more detail by way of figures, in which.

DETAILED DESCRIPTION OF THE EXEMPLARY EMBODIMENTS

Figure 1:
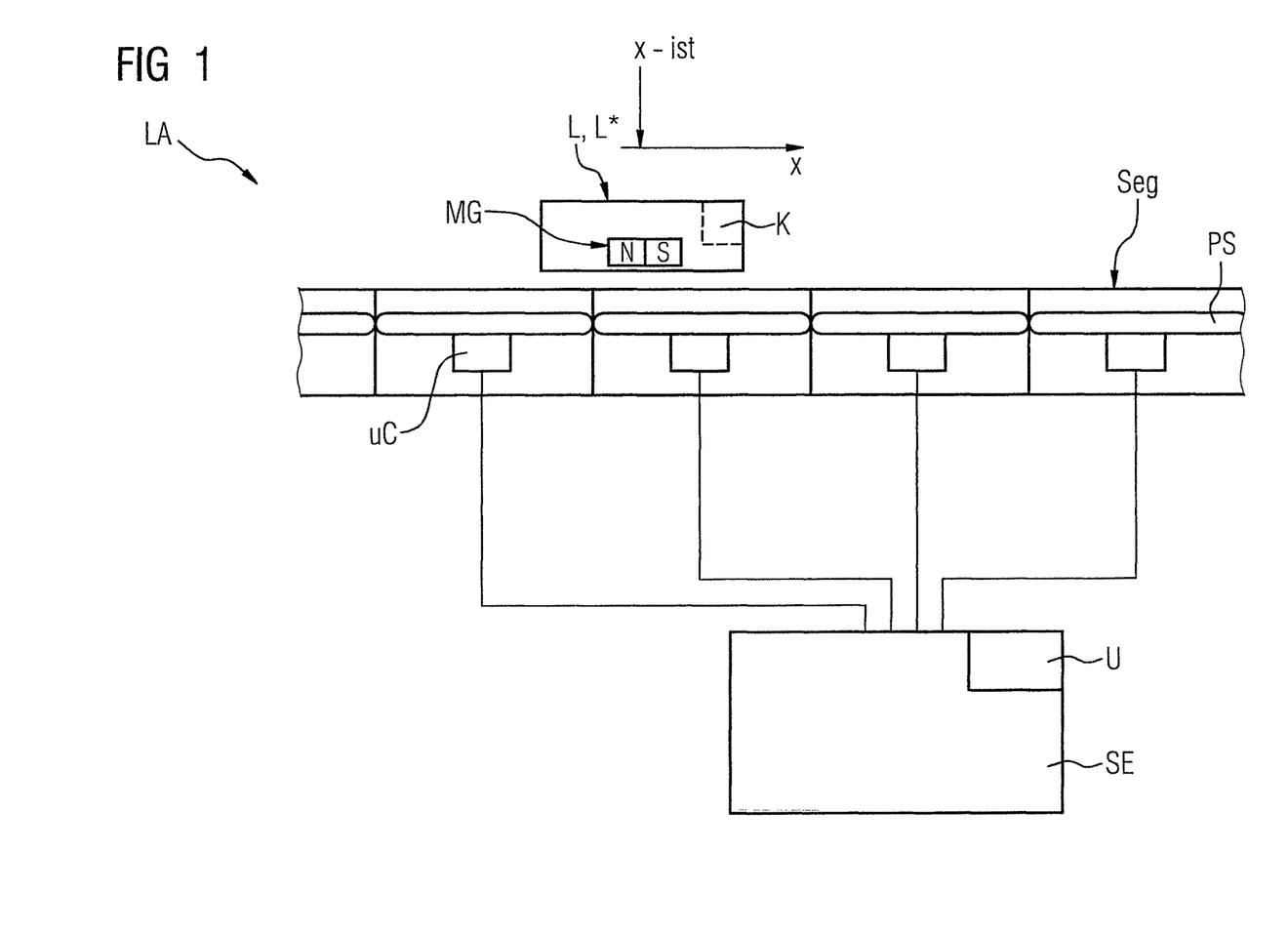
FIG. 1 shows a linear drive in accordance with the invention.

FIG. 1 shows a linear drive LA. The linear drive comprises segments Seg, where the segments Seg are arranged next to one another to form a row. The segments Seg shown here are configured as linear motor stators (i.e., primary elements of the linear motor). At least one segment Seg may also be configured as a conveyor belt.

A runner L is positioned on the segments. The runner may be a first runner L* (also referred to as a reference runner) or a further runner L. The runner has a detection element MG. Here, the detection element MG is configured as a permanent magnet. The runner L, L* is moved in a direction x on the respective segment Seg. The runner L, L* is situated at a position x-ist. The sensor additionally has an identification K. The identification K may comprise an address of the runner and/or the deviation of the runner L, L*.

The respective sensor and/or the respective computing unit uC is connected to a control device SE. A signal connection serves to connect the control unit SE and the respective sensor and/or the respective computing unit uC. The signal connection may have a bidirectional embodiment. By way of example, the signal connection is formed as network connection.

The control device SE may be connected to one or more control units U or comprise the control units. The control units U comprise a power converter and are configured supply to supply current or voltage to at least one segment Seg.

Figure 2:
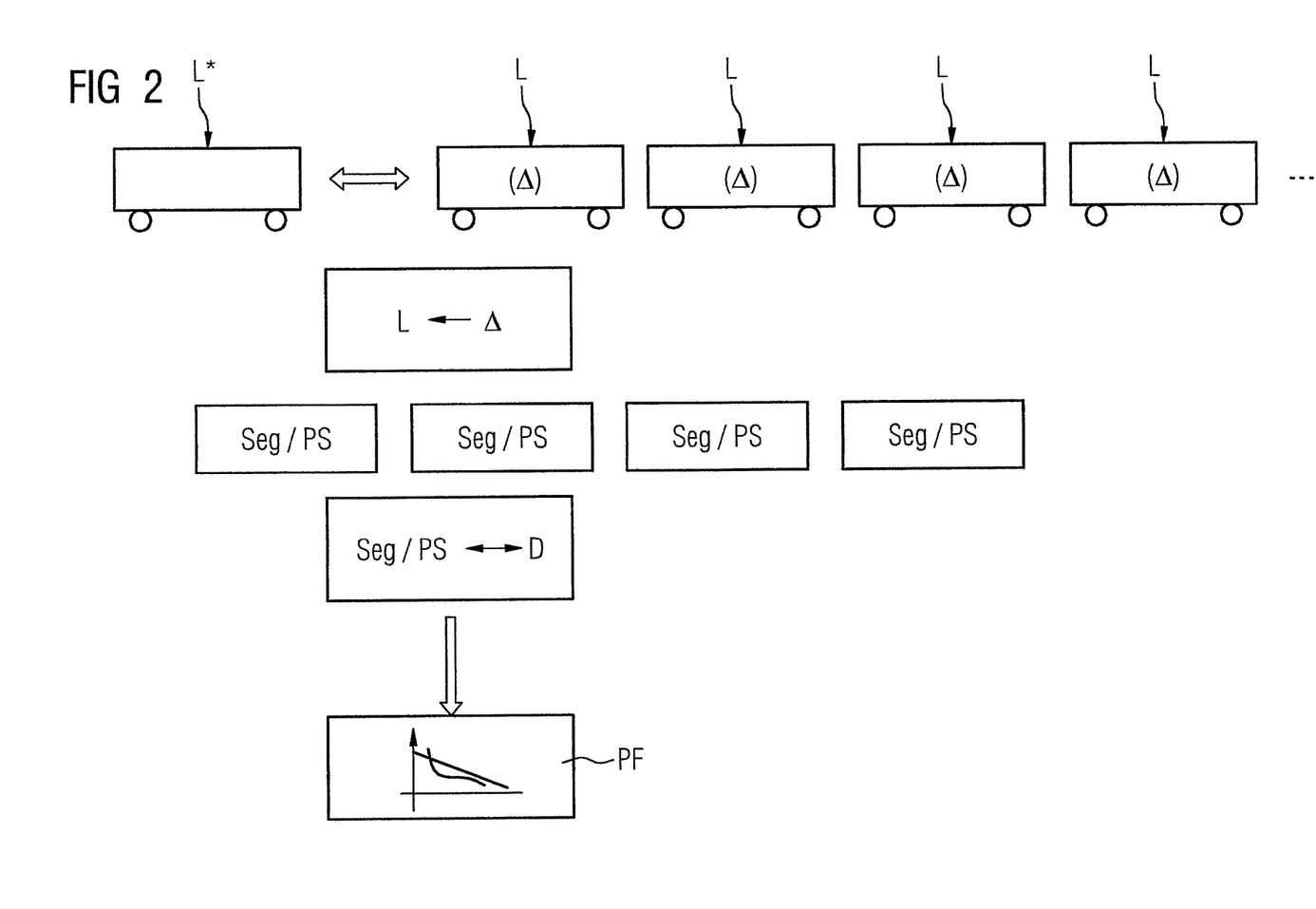
FIG. 2 shows a method in accordance with the invention.

FIG. 2 shows a method in accordance with the invention. Here, deviations Δ are determined in a first method step. To this end, the respective places and/or alignments of the detector element MG are determined, here. The deviation Δ is determined by comparing the respective further runner L with a first runner L*. The first runner L* is also referred to as reference runner.

The respective deviation is assigned to the corresponding runner in a second method step. By way of example, the assignment is performed by storing the respective deviation Δ on the identification K of the respective runner.

The discrepancy D of the respective sensor PS is ascertained in a third method step. In the example shown, a sensor PS is assigned to each segment Seg. Hence, a discrepancy D is assigned to the sensor of the respective segment Seg.

In a further method step, the discrepancy D of the respective sensor PS and the deviation Δ of the respective runner L are linked to form a position error PF. A simple addition (D+Δ=PF) serves in a simple case for linking the deviation Δ and the discrepancy D.

The position error PF may be provided as a value table and/or as a function of the control device SE or of the respective control unit U. Advantageously, the position error PF occurs upon starting up the linear drive LA.

Figure 3:
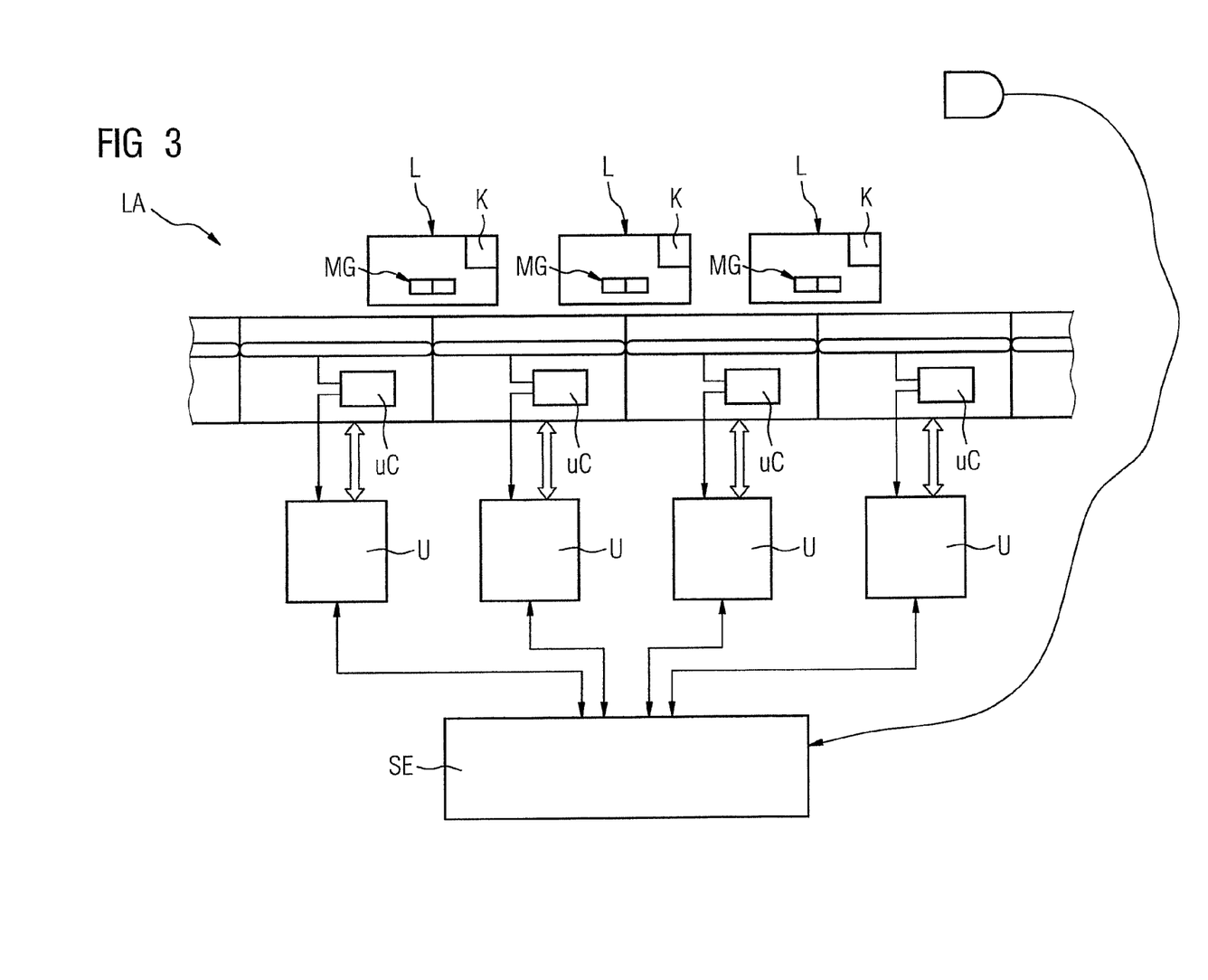
FIG. 3 shows a linear drive in accordance with the invention.

FIG. 3 shows a linear drive La in accordance with the invention. In a manner analogous to the linear drive from FIG. 1, the linear drive comprises segments Seg and sensors PS assigned to the segments Seg in each case. Further, a plurality of runners L that are positioned on the segments Seg are shown. The runners L each have an identification K. Each runner L further comprises a detection element MG. The detection element MG may comprise a permanent magnet or as a luminous element. For the purposes of communication between the control device SE and the runners L, the linear drive comprises an element for passing and/or recalling the respective identification K of the respective runner L.

In the linear drive LA illustrated, each segment Seg is assigned to a control unit U. The control unit U serves to supply current or voltage for the segment. Further, the control unit U serves to record the position x-ist of the respective runner L or the respective runners L on each segment Seg.

The control units U are respectively connected to the control device SE by a signal connection, preferably a signal connection with a bidirectional embodiment. The signal connection serves to control the movement of the runners L through the respective segment Seg via the respective control unit U.

An identification capturing device D serves to read out the identification of the runners L, L*. By way of the identification capturing device, the deviation Δ, which is assigned to the runner in the identification, is fed to the control device SE and/or the respective control unit U.

Figure 4:
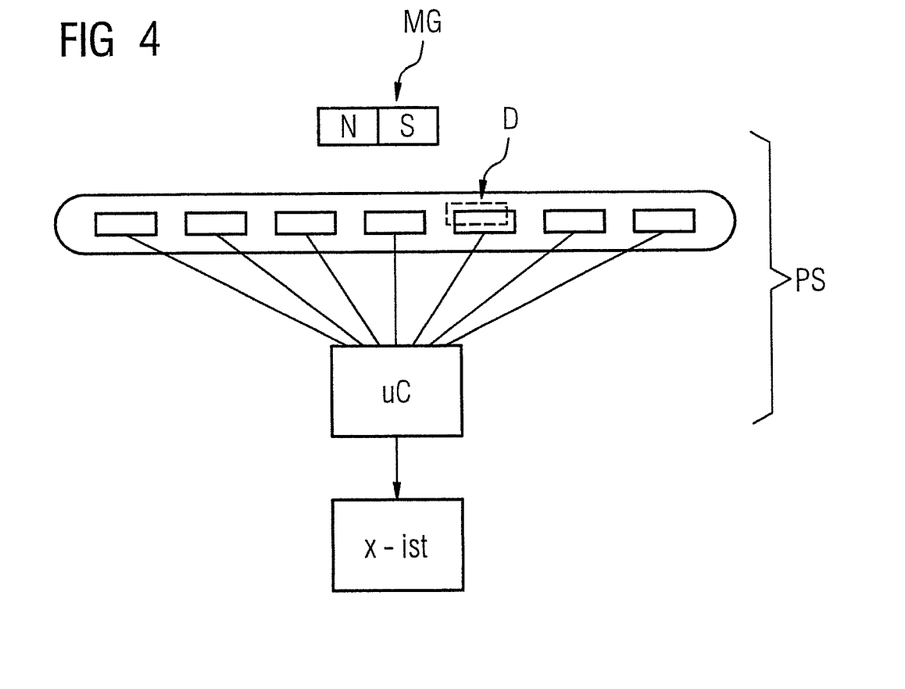
FIG. 4 shows a sensor in accordance with the invention.

FIG. 4 shows a sensor PS in accordance with the invention. The sensor PS comprises a multiplicity of sensor elements, e.g., Hall sensor elements in this case. The sensor elements register the position x-ist of the detection element MG. The detection element MG comprises a permanent magnet. The respective sensor elements are assembled spaced apart at a distance.

A discrepancy of the sensor PS occurs if a sensor element is not assembled precisely at the provided place. The sensor elements are respectively connected to the computing unit uC. The computing unit uC serves to combine the signals from the sensor elements. The computing unit uC puts together the position of the detection element MG and, hence, the position of the respective runner L, L* from the signals of the sensor elements.

Figure 5:
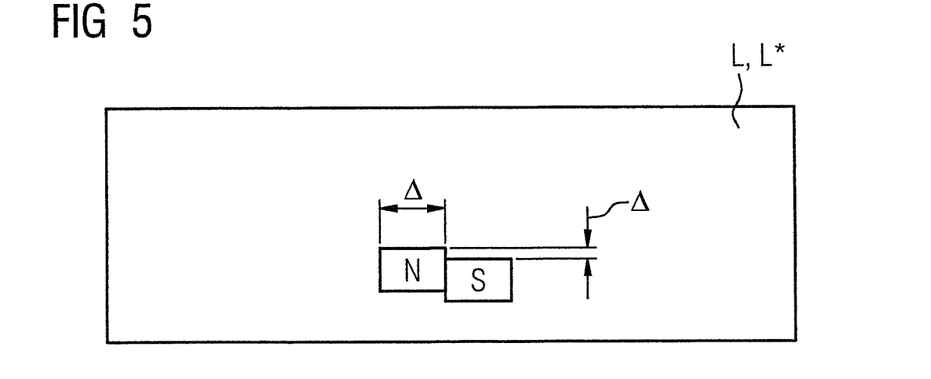
FIG. 5 shows the deviation of a detection element.

FIG. 5 shows the deviation Δ. The deviation Δ is the difference of the place and the alignment, at (or in) which the detection element MG is situated, and the provided place and/or alignment of the detection element MG (absolute deviation). The deviation may also be ascertained in relation to the place and/or alignment of the detection element MG of the first runner L* (of the reference runner) (relative deviation).

Figure 6:
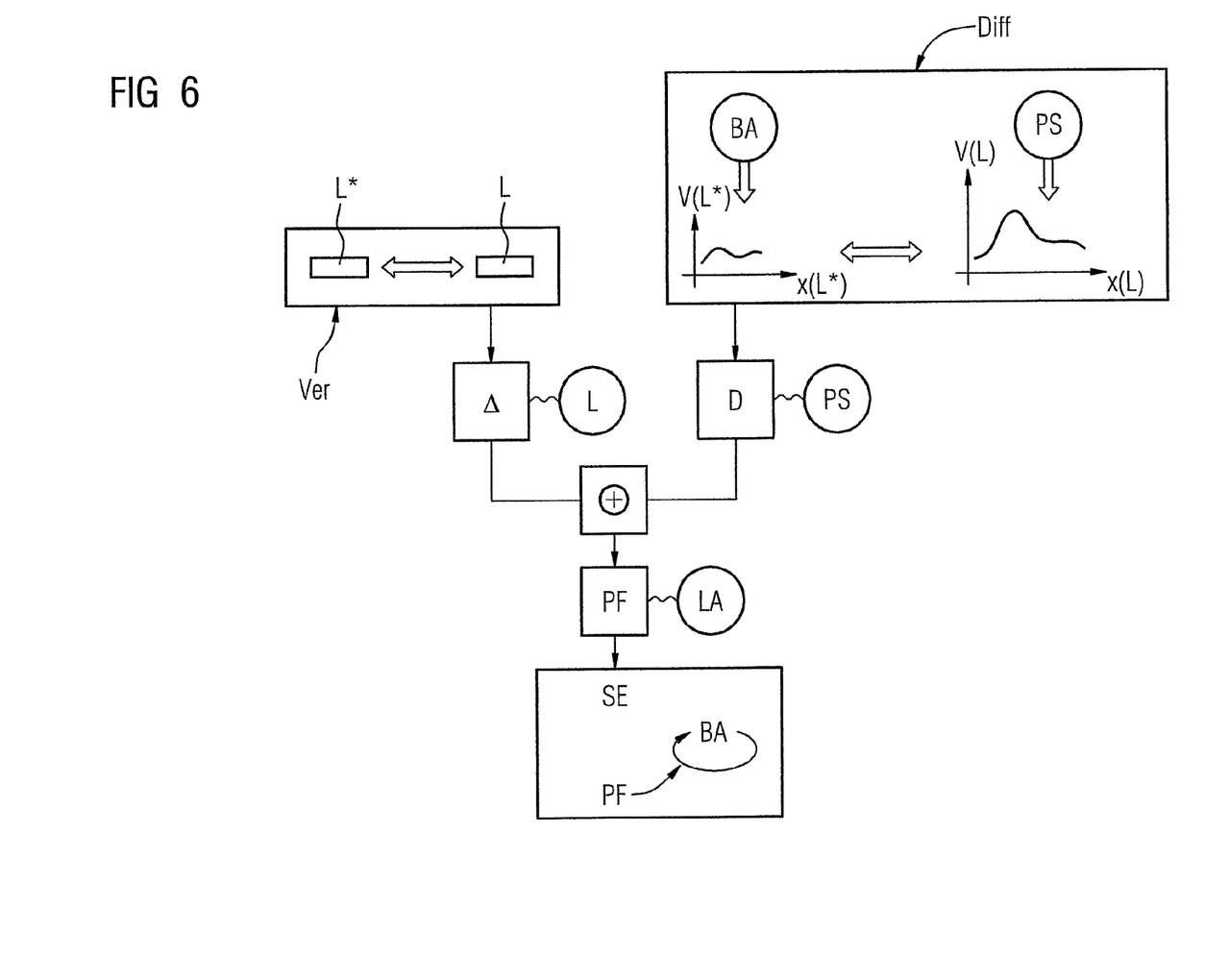
FIG. 6 shows a method for correcting the position error.

FIG. 6 shows a method for correcting the position error PF in accordance with the invention. The position error PF is composed of the deviation Δ and the discrepancy D. The deviation Δ is determined when comparing Ver the place and the alignment of the detection element MG of the respective further runner L with the first runner L*.

The discrepancy D is determined in a comparison Diff between the movement of the first runner in accordance with a movement sequence BA and the movement ascertained with the aid of the sensor PS. To this end, a movement of the first runner L* is predetermined by the movement sequence BA. Advantageously, the speed v(L*) is predetermined by the movement sequence depending on the position x-ist in the movement direction x(L*) of the runner L*. Then, the speed v(L*) and/or the position x-ist of the first runner L* is ascertained using the sensor PS. The discrepancy D is ascertained from a comparison of the positions of the runner L* in accordance with the movement sequence BA and the ascertained position x-ist. The discrepancy D is assigned to the respective sensor.

The place and/or alignment at which each detection element MG fastened is compared with the place/alignment of the detection element MG of the first runner L* for the purposes of determining the deviation Δ of the respective further runner L. Hence, a deviation is ascertained for the respective further runner L and the respective deviation of the respective runner L is assigned.

The position error PF is ascertained from the discrepancy D assigned to the respective sensor PS and the deviation Δ assigned to the respective further runner L via linking, in particular by (direct) addition. The position error PF is assigned to the linear drive LA.

The position error is made available to the control device SE of the linear drive LA. The control device SE corrects the movement sequence BA on the basis of the position error PF.

Figure 7:
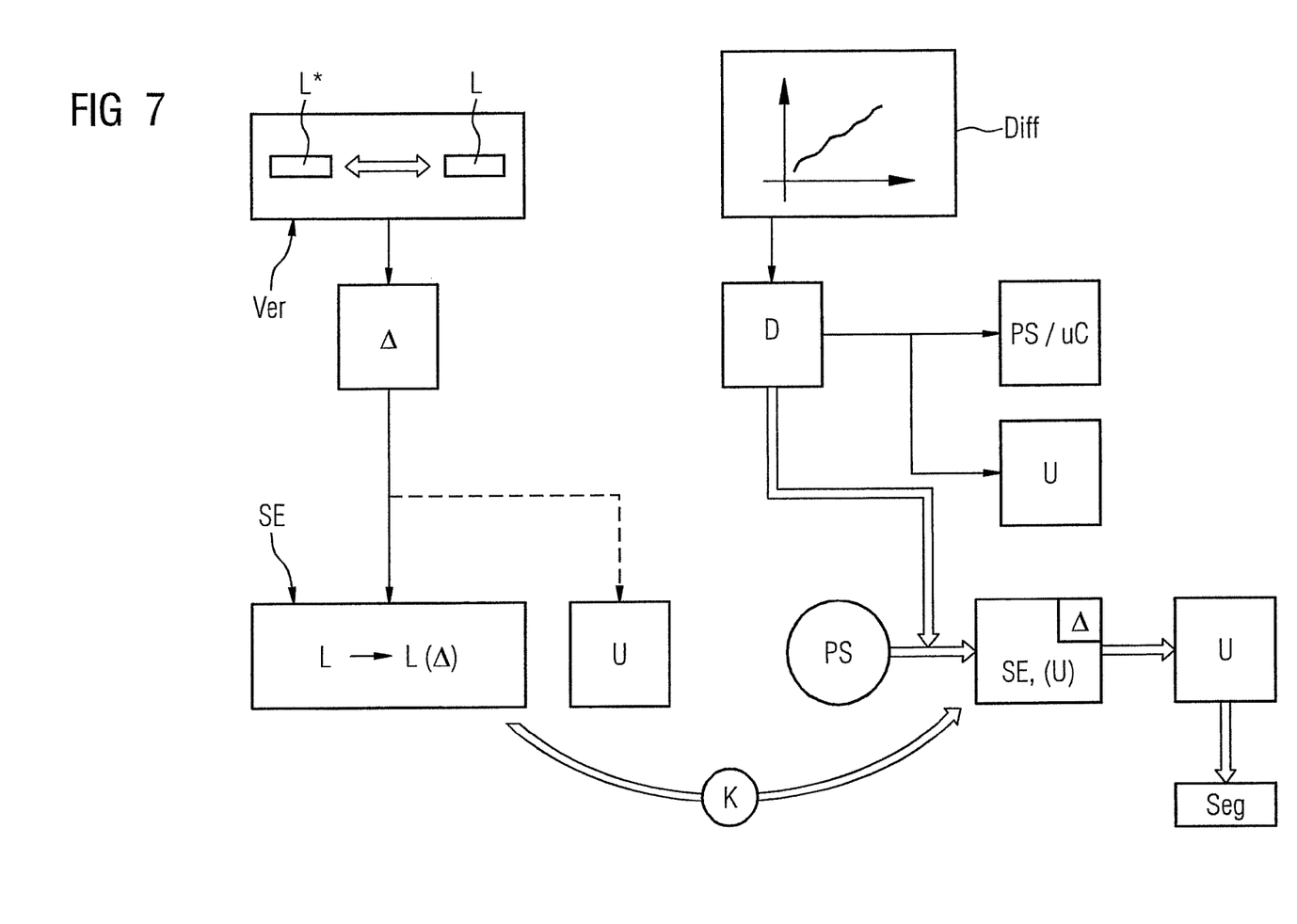
FIG. 7 shows a further method for correcting the position error in accordance with a further embodiment of the invention.

FIG. 7 shows a further method for correcting the position error PF. In this method, the deviation Δ is determined in a first step with the aid of a comparison Ver and the respective deviation Δ is assigned to the respective further runner L. As indicated above, the comparison Ver for determining the respective deviation of the respective further runner is performed by a comparison between the positions of the respective detection element MG of the respective further runner L and the position of the detection element MG of the first runner. Here, the deviation Δ is provided for the control device SE and/or the respective control unit U.

The discrepancy D of the respective sensor is determined in a further comparison Diff. The discrepancy D of the respective sensor PS is determined by virtue of the first runner L* being positioned at a multiplicity of predetermined positions x-BA. The respective predetermined positions x-BA are compared to the positions x-ist determined by the respective sensor PS. Hence, the nonlinearity of the sensor PS, i.e., is determined. The discrepancy D of the sensor PS emerges from the respective difference from the predetermined position x-BA and the ascertained position x-ist of the first runner L*.

The discrepancy is advantageously provided as a value table or as an error function for the sensor PS, i.e., for a computing unit uC assigned to the sensor and/or to the control unit U.

For the purposes of correcting the position error PF, i.e., when operating the linear drive LA, the respective position x-ist of the respective runner L, L* is determined by the respective sensor PS. The signal of the sensor PS is corrected either in the control unit U or with the aid of the computing unit assigned to the respective sensor PS. Thus, a respectively discrepancy-corrected position i-ist of the respective runner L, L* is available in the control unit U.

The respective runner L, L* in each case has an identification K. The identification K is detected. Advantageously, a deviation Δ of the respective runner L, L* is available for the identification K. The discrepancy-corrected position is corrected based on the identification of the respective runner L, L* with the corresponding deviation Δ, preferably in the control device SE. The discrepancy-corrected and deviation-corrected position x-ist corresponds to the position-error-corrected position x-ist of the runner. The position-error-corrected position i-ist regularly corresponds to the "real position" of the respective runner L, L*. The position-error-corrected position x-ist of the respective runner is provided for the respective control unit U as input variable for controlling and/or regulating the movement or positioning of the respective runner L*. There is a controlled and/or regulated movement of the respective runner L, L* based on the position-error-corrected position x-ist of the respective runner L, L* on the respective segment Seg.

The respective position-error-corrected position of the respective runner L, L* serves as input value for regulating the position of the respective runner L, L*.

Preferably, the deviation Δ of the respective further runner L is stored as a function of the identification K thereof in the control device SE or in the respective control unit U.

The identification is preferably read out by a detector and provided for the control unit U, the respective sensor PS and/or the control device SE.

In summary, the invention relates to a method for ascertaining a position error PF in a linear drive LA, to a linear drive, to a method for operating such a linear drive LA and to an installation. The deviation Δ of the respective further runner L in relation to a first runner L* (reference runner L*) is ascertained to determine the position error PF. Further, the discrepancy D of the respective sensor PS is ascertained based on the deviation Δ of the runner L. The discrepancy D may be ascertained using a reference system. The position error may be established based on the discrepancy D of the respective sensor PS and the deviation Δ of the respective runner L. The position error may serve for the improved positioning, i.e., more precise positioning, of the respective runner L on the linear drive LA or of the segments Seg.

Figure 8:
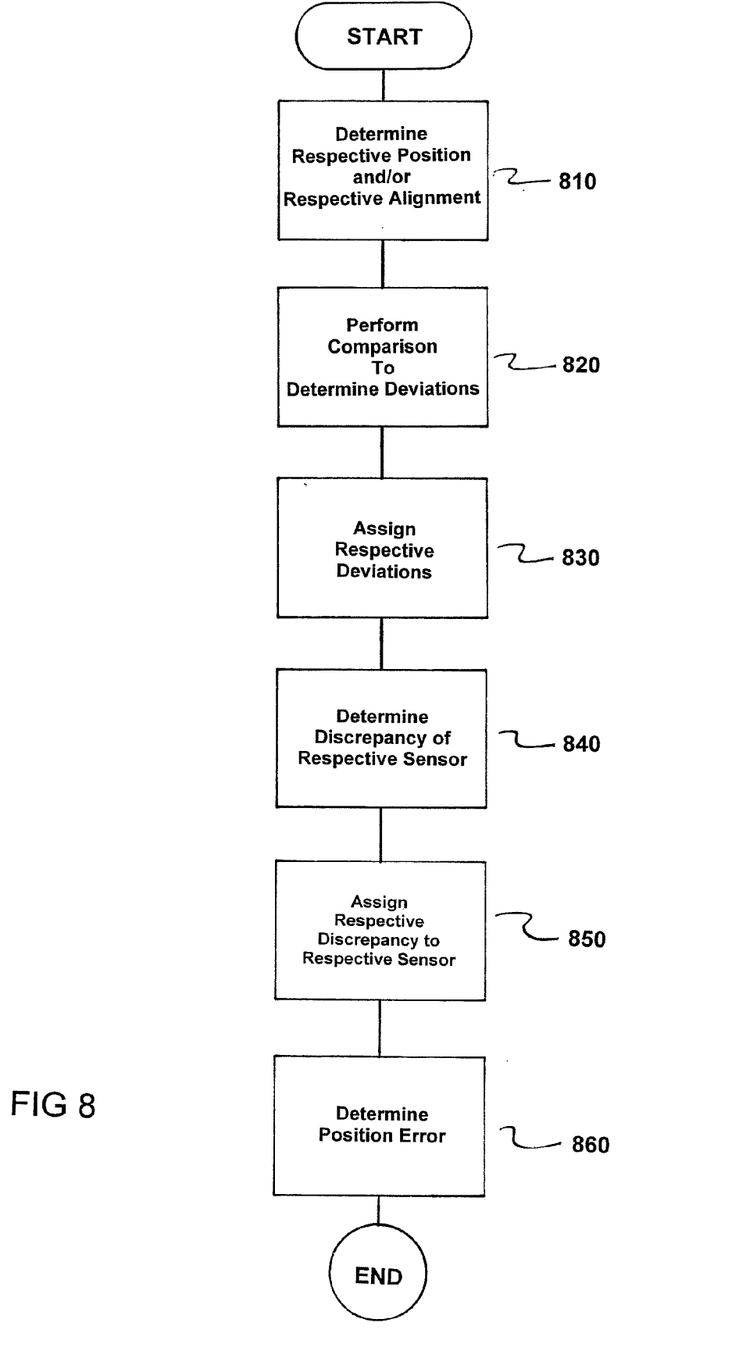
FIG. 8 is a flowchart of the method in accordance with the invention.

FIG. 8 is a flowchart of a method for ascertaining a position error PF for a linear drive LA comprising runners L*, L, at least one segment Seg, at least one sensor PS and a control device SE, where each respective runner L*, L comprises a detection element MG, and a respective position x-ist of a respective runner L is ascertained based on the detection element MG via at least one sensor PS.

The method comprises determining at least one of (i) a respective position and (ii) respective alignment of a detection element (MG) of a first runner L* and further runners L, as indicated in step 810.

Next, at least one of (i) the respective position and (ii) the alignment of the detection element MG of the respective further runners L is compared Ver with at least one of (i) the position and (ii) alignment of the respective detection element MG of the first runner L* to determine deviations Δ between at least one of (i) the respective position and (ii) the respective alignment of the detection element MG of the respective further runner L and at least one of (i) the position and (ii) alignment of the detection element MG of the first runner L*, as indicated in step 820.

The respective deviation Δ is now assigned to the respective further runner L, as indicated in step 830. Next, the discrepancy D of the respective sensor PS is determined aided by the first runner L*, as indicated in step 840.

The respective discrepancy D is now assigned to the respective sensor PS, as indicated in step 850.

The position error PF of the respective runner L, L* is now determined by linking the deviation Δ of the respective further runner L and the nonlinearity D of the sensor, as indicated in step 860.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for ascertaining a position error for a linear drive comprising runners, at least one segment, at least one sensor and a control device, each respective runner comprising a detection element, and a respective position of a respective runner being ascertained based on the detection element via at least one sensor, the method comprising:
    determining at least one of (i) a respective position and (ii) respective alignment of a detection element of a first runner and further runners;
    comparing at least one of (i) the respective position and (ii) the alignment of the detection element of the respective further runners with at least one of (i) the position and (ii) alignment of the respective detection element of the first runner to determine deviations between at least one of (i) the respective position and (ii) the respective alignment of the detection element of the respective further runner and at least one of (i) the position and (ii) alignment of the detection element of the first runner;
    assigning the respective deviation to the respective further runner;
    determining a discrepancy of the respective sensor aided by the first runner;
    assigning the respective discrepancy to the respective sensor; and
    determining the position error of the respective runner by linking the deviation of the respective further runner and the nonlinearity of the sensor.

2. The method as claimed in claim 1, wherein a position, corrected by the discrepancy, of the respective runner is provided based on the discrepancy of the respective sensor.

3. The method as claimed in claim 1, wherein the respective discrepancy is determined after arranging the segments in accordance with a first discrepancy determination method comprising:
    positioning the first runner on the respective segment in accordance with a predetermined movement sequence;
    ascertaining the respective position of the respective runner aided by the at least one sensor;
    comparing the ascertained position with a position of the first runner predetermined by the movement sequence; and
    determining the discrepancy of the at least one sensor from the comparison.

4. The method as claimed in claim 1, wherein a method for determining the discrepancy of the at least one sensor is performed based on a second discrepancy measurement method, said second discrepancy measurement method comprising:
    moving the first runner aided by a reference system, said reference system positioning the first runner in accordance with a predetermined movement sequence at a respectively predetermined position;
    ascertaining the position of the first runner aided by the at least one sensor;
    comparing the ascertained position and the predetermined position;
    determining the discrepancy of the at least one sensor based on the comparison.

5. The method as claimed in claim 1, wherein an identification is assigned in each case to the at least one further runner.

6. The method as claimed in claim 1, wherein one sensor is assigned to each respective segment.

7. The method as claimed in claim 1, wherein at least one sensor ascertains the respective position of the runners over a plurality of segments.

8. The method as claimed in claim 1, wherein position error/errors is provided in a value table or a correction function of the control device.

9. The method as claimed in claim 1, wherein a position, corrected by the deviation, of the runner is provided based on the respective deviation of the respective further runner.

10. The method as claimed in claim 2, wherein a position, corrected by the deviation, of the runner is provided based on the respective deviation of the respective further runner.

11. The method as claimed in claim 1, wherein the movement of each respective runner is performed based on a virtual axis; and wherein the deviation of the respective runner is assigned to a respective virtual axis.

12. The method as claimed in claim 1, further comprising:
    operating the linear drive to compensate for the position error;
    wherein a movement sequence comprising a virtual axis is assigned to the respective runners; and
    wherein the movement sequence of the respective runner about the ascertained position error thereof is ascertained.

13. The method as claimed in claim 1,
    wherein the discrepancy is assigned to the sensor which is assigned to the respective sensor;
    wherein the sensor provides a position of the runner corrected by the discrepancy;
    wherein the deviation is assigned to each respective further runner;
    wherein the deviation of the respective further runner is taken into account when providing the respective position of the respective further runner; and
    wherein the position of the respective further runner respectively corrected by the discrepancy and the deviation is provided to at least one of (i) a control device and (ii) the respective control unit to correct a position of the linear drive.

14. The method as claimed in claim 13, wherein the sensor comprises a computing unit.

15. The method as claimed in claim 13, further comprising:
    operating the linear drive, the linear drive comprising at least one segment, further runners, at least one control unit, sensors and, optionally, a control device, the method further comprising:
    positioning the further runners on segments;
    at least one of controlling and regulating the position of the further runners by the respective control unit;
    ascertaining at least one of a position and speed of the respective runner on the respective segment by the respective sensor;
    correcting the position error of the position of the respective runner;
    wherein the respectively corrected position of the respective further runner serves to control or regulate the positioning of the respective further runner on the respective segment in at least one of (i) the control unit and (ii) the control device.

16. The method as claimed in claim 13, further comprising:
    operating the linear drive to compensate for the position error;
    wherein a movement sequence comprising a virtual axis is assigned to the respective runners and wherein the movement sequence of the respective runner about the ascertained position error thereof is corrected.

17. A linear drive comprising:
a control device;
at least one segment;
at least one runner;
at least one control unit; and
at least one sensor;
wherein one of the control device and a respective control unit is configured to:
   determine at least one of (i) a respective position and (ii) respective alignment of a detection element of a first runner and further runners;
   compare at least one of (i) the respective position and (ii) the alignment of the detection element of the respective further runners with at least one of (i) the position and (ii) alignment of the respective detection element of the first runner to determine deviations between at least one of (i) the respective position and (ii) the respective alignment of the detection element of the respective further runner and at least one of (i) the position and (ii) alignment of the detection element of the first runner;
   assign the respective deviation to the respective further runner;
   determine a discrepancy of the respective sensor aided by the first runner;
   assign the respective discrepancy to the respective sensor; and
   determine the position error of the respective runner by linking the deviation of the respective further runner and the nonlinearity of the sensor.

18. An installation comprising the linear drive as claimed in claim 17.

19. The installation of claim 18, wherein the installation comprises one of a production machine, a machine tool, a packaging machine and a filling installation.

* * * * *